Aug. 20, 1968   B. F. McCLINTIC ET AL   3,397,759
VELOCITY LIMITER
Filed Sept. 15, 1965   4 Sheets-Sheet 1
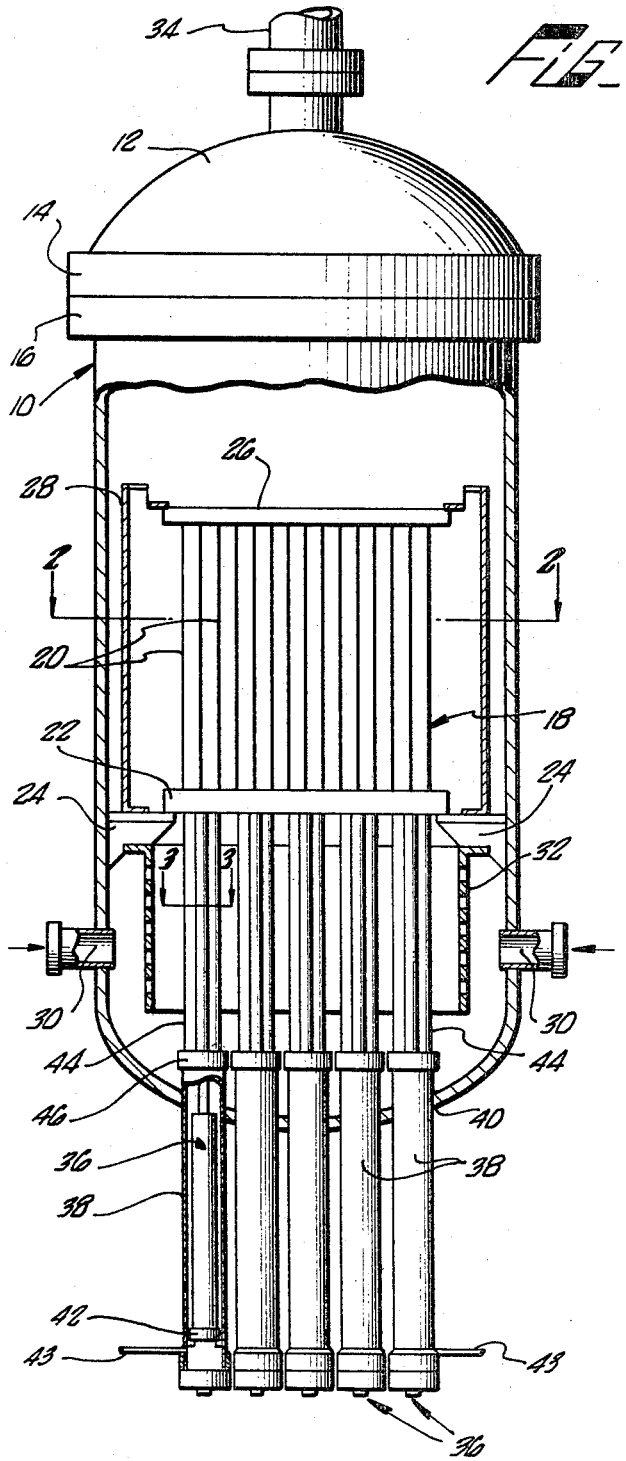
INVENTORS.
BRUCE F. McCLINTIC
BY ROBERT L. HUGHES
Christie, Parker & Hale
ATTORNEYS.

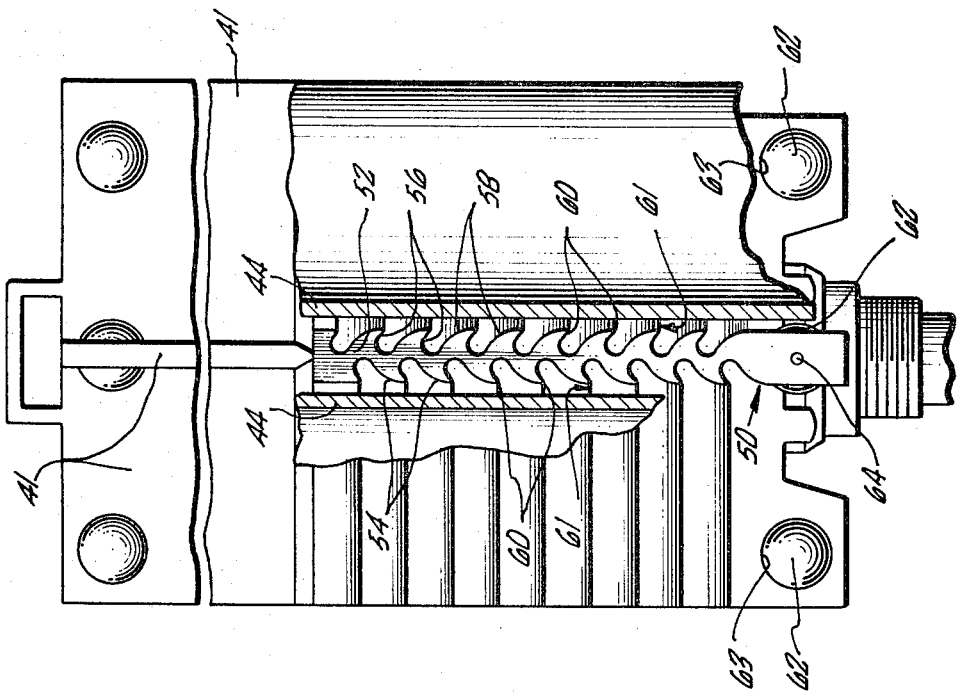
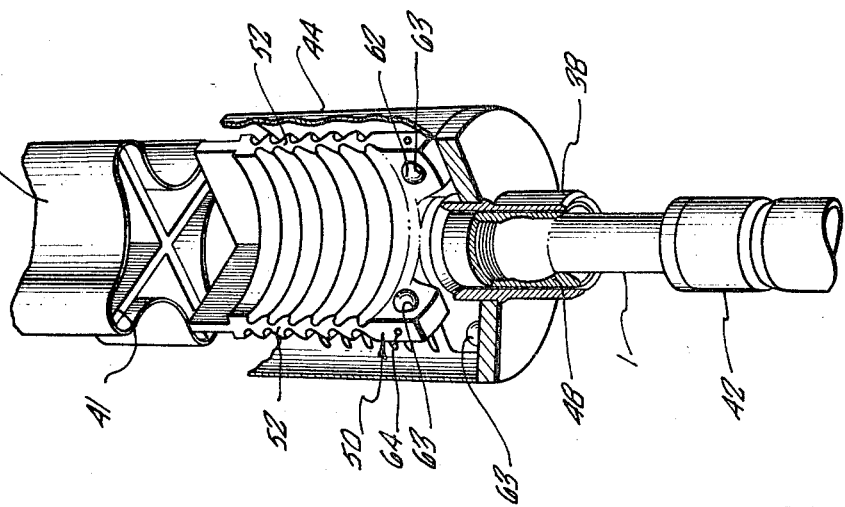

Aug. 20, 1968   B. F. McCLINTIC ET AL   3,397,759
VELOCITY LIMITER
Filed Sept. 15, 1965   4 Sheets-Sheet 3
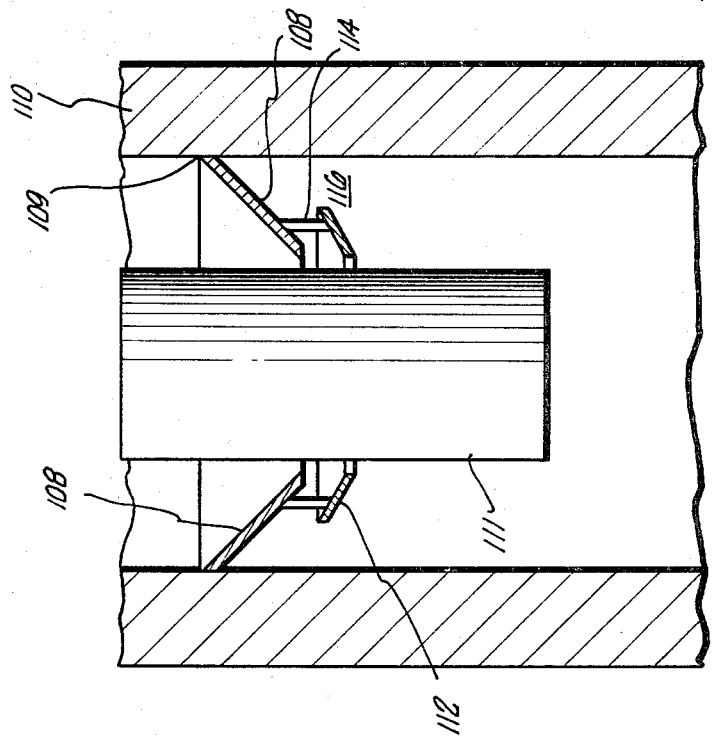
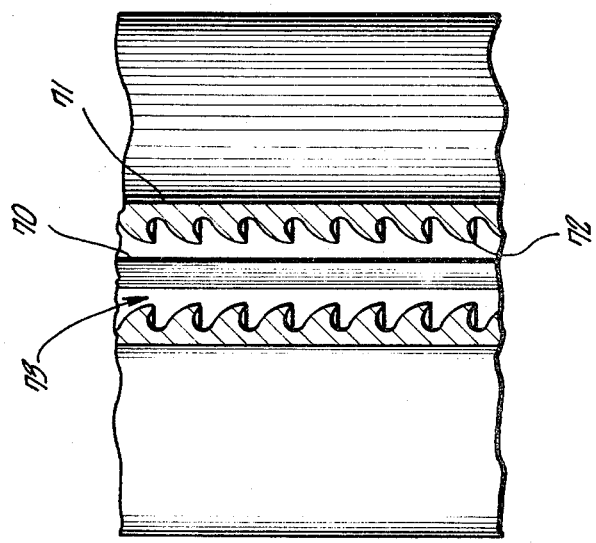
INVENTORS.
BRUCE F. McCLINTIC
BY ROBERT L. HUGHES
Christie, Parker and Hale
ATTORNEYS.

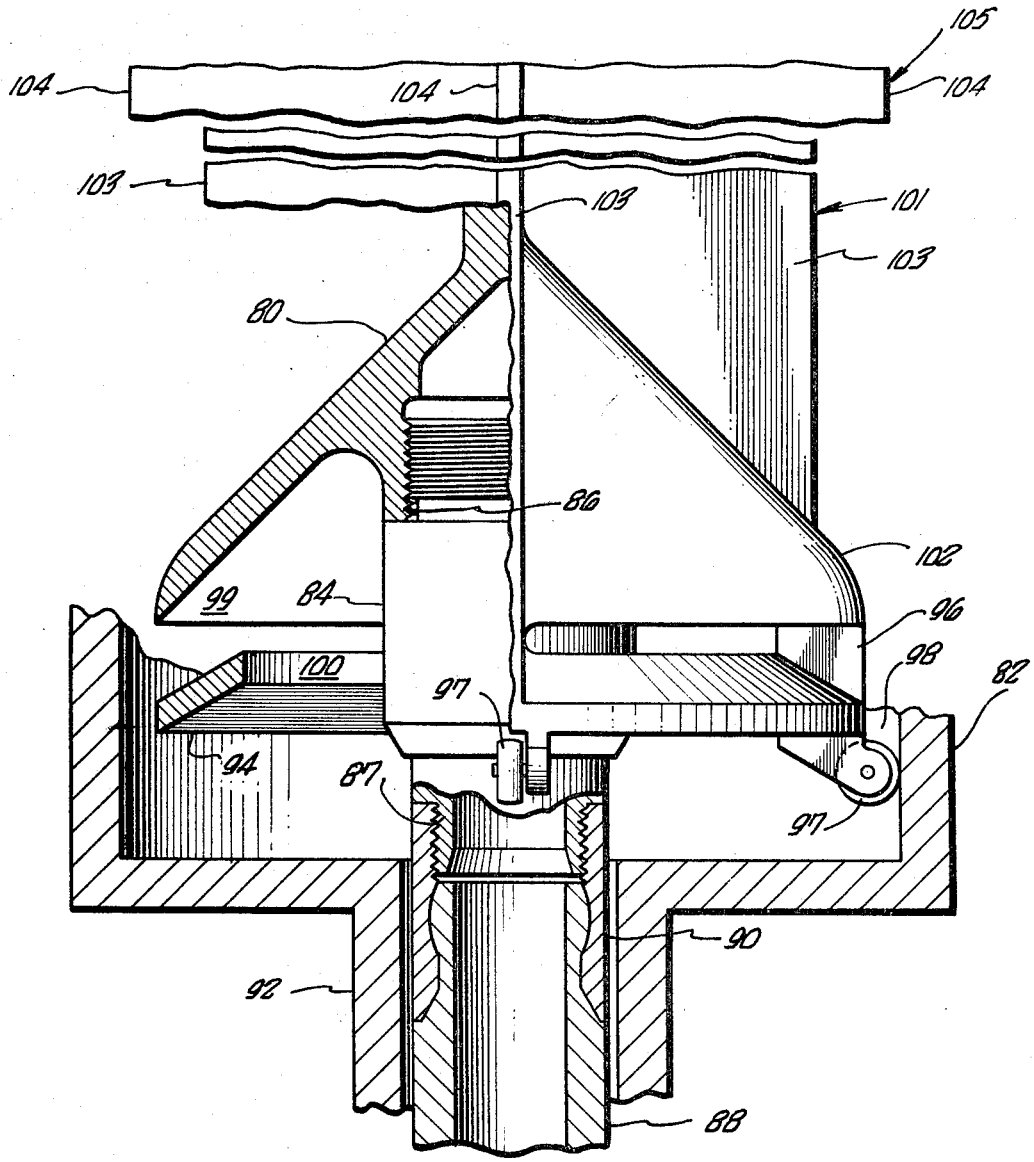

United States Patent Office 3,397,759
Patented Aug. 20, 1968

3,397,759
VELOCITY LIMITER
Bruce F. McClintic and Robert L. Hughes, San Jose,
Calif., assignors to General Electric Company, New
York, N.Y., a corporation of New York
Filed Sept. 15, 1965, Ser. No. 487,438
7 Claims. (Cl. 188—96)

ABSTRACT OF THE DISCLOSURE

This describes a velocity limiting device comprising a fluid filled guide channel containing a control member which is reciprocable in the guide channel. A gap is provided for passage of the fluid from one side of the control member to the other as the control member moves within the guide channel. Means are provided to generate more turbulence in the fluid flowing through said gap in one direction than in the other whereby the resistance to the movement of the control member is greater in said one direction.

---

Such devices as described herein are useful in many instances where controlled movement of an object is required. For example, the devices are used in shock absorbers, machine tools, jacks, and hoists. The devices are also used in the remote positioning and control of movement of objects within an enclosure under nonatmospheric conditions of temperature and pressure. One such use of the devices is in the positioning and control of movement of a nuclear reactor poison or control element in a chain reacting assembly or core of a nuclear reactor to vary neutron flux and power levels. To illustrate the present invention, the device is described as used in a nuclear reactor, although it can be used in other applications.

U.S. Patent No. 3,020,888 describes a nuclear reactor with means for regulating the movement of the control element to vary the power output of the reactor. In a nuclear reactor, fissionable atoms such as $U^{233}$, $U^{235}$, $Pu^{239}$, and $Pu^{241}$ absorb neutrons in their nuclei and undergo a nuclear disintegration. This produces on the average of two fission products of lower atomic weight and greater kinetic energy, and usually two or three neutrons, also of high energy.

Fission neutrons thus produced diffuse through the nuclear chain-reacting assembly and are either used or lost in several distinct competing mechanisms. Some neutrons migrate to the boundary of the chain-reacting assembly and escape or are lost from the system. Other neutrons undergo nonfission or radiative capture in the nuclear fuel. Still other neutrons undergo fission capture in the fuel producing additional fission neutrons. For example, fast neutrons are thus captured in $U^{235}$ or $U^{238}$ and thermal neutrons are thus captured in $U^{235}$. Still other neutrons undergo parasitic capture in the various extraneous or nonfissionable portions of the chain-reacting assembly, such as in the moderator, coolant, various structural materials necessarily present, fission products in the fuel, as well as in the nuclear reaction control elements.

The neutron balance between the production of fission neutrons and these various competing mechanisms for neutron utilization determine whether or not over any given time interval the fission reaction is self-sustaining, decreasing, or increasing. When the reaction is self-sustaining, the neutron multiplication factor ($k_{eff}$) equals 1.00, the neutron population remains constant, and on the average, there is one neutron remaining from each fission event which induces a subsequent fission. Heat generation is thus continuous and it may be maintained so long as sufficient fissionable material is present in the system to override the effects of fission products, some of which are very strong nuclear reaction poisons, which are produced during operation. The heat generated in the system may be removed by passing a coolant through heat exchange relationship with the nuclear fuel in the chain-reacting assembly and such heat may be used as such or to produce mechanical or electrical power.

The neutron population and the power output of the nuclear reactor depend on the extent to which neutrons are consumed or wasted in nonfission capture. This type of consumption is regulated by changing the relative amount of control element material in the chain-reacting assembly or core. Control elements are usually in the form of rods, sheets, or blades which are mounted to be moved into and out of the chain-reacting assembly. A suitable drive mechanism is customarily connected to the control elements so their positions can be set in the nuclear reactor and thus control its power output. The control elements contain materials with atoms that have high nonfission neutron capture cross sections, i.e., atoms which readily absorb and hold neutrons without undergoing nuclear disintegration to produce additional neutrons. Some of the common control materials are boron, cadmium, silver, and mercury in elemental, alloy, or compound form.

In a typical nuclear reactor, the drive means for moving and holding the control rods in the desired position must usually pass through a fluid-tight seal and yet be free to move through the vessel wall. Such seals are invariably subject to wear, particularly under the conditions of high temperature and pressure prevailing in nuclear reactors. The high intensity of radio activity also tends to weaken and accelerate deterioration of materials.

Failure of a control element driving mechanism could result in a runaway operation of a nuclear reactor. For example, the high pressure inside the reactor tends to drive the control elements out of the chain-reacting assembly. If this were permitted, the neutron flux would immediately rise to a high level. Accordingly, safety requires that the movement of the control elements out of the nuclear reactor be at a controlled and retarded rate. On the other hand, a sudden change in the amount of power taken from the reactor can result in a build up of neutron flux which requires immediate and rapid insertion of the control elements to effect "scram," or a rapid shutdown of the reactor. Consequently, the control elements must be relatively free to move rapidly into the chain-reacting assembly and yet restrained from being driven out at a high rate. Moreover, this difference in resistance to movement of the control elements, for maximum safety, must be achieved with few or no moving parts such as levers, check valves, flexible cups, packing, and the like, because such elements are subject to wear, failure, and rapid deterioration due to corrosive conditions and high intensity neutron and gamma radiation.

This invention provides a control mechanism which is easily moved in one direction, and yet offers high resistance to movement in the opposite direction without requiring the presence of auxiliary moving parts such as check valves, levers, flexible cups, etc. The device of this invention is easily connected to a control element in a nuclear reactor so the control element can be moved freely into the reactor and yet offers high resistance to movement out of the reactor in case of failure of the drive mechanism for regulating the position of the control element. This gives time to move other control rods into the reactor core to compensate for the loss of the one forced out.

Briefly, the preferred embodiments of the velocity control mechanism of this invention include a hollow body adapted to hold a fluid. A control body is mounted in the hollow body and spaced from it. Means are connected to the control body for reciprocating it in the hollow body to drive fluid back and forth through the space between the two bodies. Means are provided on at least one of the bodies for generating more turbulence in the fluid flowing through the space when the control body is moved in one direction than the other.

Preferably, the desired turbulence is achieved by the surface of one of the bodies being shaped to direct fluid into the gap more turbulently when the control body is moved in one direction than when it is moved in the other. In one form, this result is achieved by providing at least two surfaces on one of the bodies which diverge from each other in the direction in which the control body moves when maximum turbulence is required. For example, one or more cavities is formed in one of the bodies so that the cavity opens toward the gap between the bodies and is concave toward the direction in which the control body moves when maximum turbulence is required. Thus when the control body is displaced in the direction requiring maximum resistance, a portion of the fluid in the hollow body is forced to flow into the concave cavity and is partially reversed and directed laterally into the gap to interfere with the flow of the rest of the fluid through the gap, thus generating increased turbulence and pressure drop. When the control body is moved in the opposite direction, fluid tends to flow past, and not into, the concave cavity, and thus flow through the gap is more orderly with less resistance, thereby permitting faster movement of the control body in the opposite direction.

Good results have been obtained by providing in the surface of one of the bodies a groove which extends transverse to the direction of movement of the control body within the hollow body, and which has spaced surfaces diverging from each other in the direction of movement of the control body to produce maximum turbulence of fluid flowing through the gap between the two bodies. In one form, the surface for generating the desired turbulence is provided on the hollow body, and in another form, the turbulence-generating surface is on the control body. Of course, both bodies can include turbulence-generating surfaces.

In one presently-preferred embodiment, a hollow cone is attached to a control rod or body to extend toward the hollow body and in the direction in which the control rod moves when maximum turbulence is required. In this way, fluid tending to flow into the cone is reversed and directed outwardly into the gap between the cone periphery and the hollow body thereby generating turbulence and resistance to flow of fluid in the gap. When the cone is moved in the other direction, fluid flows smoothly from its tapered or convex surface into the gap with less turbulence and resistance to flow. Preferably, a skirt or deflector is secured around the periphery and on the concave side of the cone. The skirt is spaced from the cone and forms with the concave surface of the cone an inlet which converges toward the gap. The skirt thus helps to direct fluid into the gap between the cone and the hollow tube when the cone is moved toward its concave side, thus generating increased turbulence and reducing the flow path through the annulus. The skirt is shielded from the flow of fluid by the convex side of the cone when the control rod is moved in the opposite direction.

In another form of the invention, the control body is in the shape of a cruciform or cross in longitudinal cross section, and the guide body has a matching shape so that a gap of substantially uniform cross-sectional area is formed between the two bodies. A plurality of elongated teeth are secured to or formed on the control rod body and extend toward the guide tube and toward the direction in which the control body moves when maximum tolerance is required. Preferably, each of the teeth is substantially perpendicular to the direction of travel of the control rod body and is coextensive with the gap to provide maximum turbulence when the control rod body is moved in the direction in which the teeth or ridges face.

These and other aspects of the invention will be more fully understood from the following detailed description and the accompanying drawings, in which:

FIG. 1 is an elevational view, partly broken away and partly in cross section, showing the velocity limiter of this invention applied to the movement of control elements in a nuclear reactor;

FIG. 2 is a view taken on line 2—2 of FIG. 1;

FIG. 3 is a cross-sectional view of a control element and guide tube taken on line 3—3 of FIG. 1;

FIG. 4 is a view taken on line 4—4 of FIG. 3 showing one form of the velocity limiter;

FIG. 5 is a fragmentary, exploded perspective view of the control rod body of FIG. 4 in a guide tube;

FIG. 6 is a fragmentary, schematic elevational view showing an alternate embodiment of the device;

FIG. 7 is a fragmentary elevational view, partly broken away and partly in section, showing the preferred embodiment of the velocity limiter of this invention; and FIG. 8 is a fragmentary, schematic sectional elevational view of another embodiment of the invention.

Referring to FIG. 1, an upright cylindrical reactor pressure vessel 10 includes a removable head 12 secured to the top of the vessel by flanges 14 and 16. A nuclear chain-reacting assembly or core 18, made up of a plurality of vertically-disposed, nuclear-fuel-containing coolant flow channels 20, is supported within the vessel on a horizontal lower core support plate 22 which, in turn, is secured in the vessel by gussets 24. A horizontal upper core grid 26 is secured to the upper ends of channels 20 and maintains the relative spacing between them. An upright cylindrical thermal shield 28 surrounds the reactor core 18 and is spaced inwardly from the inner surface of the pressure vessel. The upper core grid guide 26 is supported from the upper end of the thermal shield, the lower end of which is secured to the gussets 24. The thermal shield attenuates gamma radiation emitted by the core and reduces heating of the pressure vessel wall.

The upper and lower ends of channels 20 are open to flow of a coolant, such as steam or water, through them. The coolant is introduced to the pressure vessel through inlet openings 30 under pressure from one or more pumps (not shown). The coolant flows through an upright perforated, cylindrical coolant diffuser 32 and then upwardly through flow channels 20. The diffuser is secured at its upper end to the gussets 24 just below core support plate 22. The heated coolant, which is partially vaporized in the case of a boiling reactor, for example, is removed from the pressure vessel through a coolant outlet 34 in the top of the dome-shaped head 12.

Control element drive mechanisms 36 are shown schematically in FIG. 1 and in more detail in U.S. Patent No. 3,020,888. Any suitable type of drive mechanism may be used, and, therefore, it is not shown in detail because it forms no part of the present invention. Each drive mechanism shown schematically in FIG. 1 is an integral unit disposed in a respective vertical cylinder 38 secured by welds 40 through the bottom wall of the pressure vessel. Control elements 41 (FIGS. 2 and 3) enter the reactor core from the bottom. They are withdrawn downwardly out of the core to start up and raise the power level of the reactor, and they are inserted upwardly into the reactor core to decrease the power level or shut the reactor down. The control elements can, if desired, be inserted from the top of the core, in which case the velocity limiter of this invention would be installed in reverse to the arrangement described in detail below. The distribution of control elements in the reactor core and the cross section of a typical control element are described in more detail below.

Referring to FIG. 2, the flow chanels 20 are square in cross section, although they can have other shapes such as circular, hexagonal, etc. In the modification shown in FIG. 2, channels 20 are spaced slightly apart from each other in a lattice on a square pitch. Control elements 41, cruciform in cross section, which may conveniently be two percent boron stainless steel, are spaced throughout the lattice between adjacent flow channels. The control elements are movable into and out of the reactor core by a separate respective piston 42 in each cylinder 38. The upper end of each piston is connected to the lower end of a respective control rod. Each piston 42 is moved upwardly by fluid supplied under pressure through a separate respective line 43 connected to the lower end of each cylinder. Each control element is moved out of the reactor by reducing the pressure supplied through line 43 and allowing the control rod to fall by its own weight or be pushed out by the pressure inside the vessel.

FIG. 3 shows a schematic cross-sectional view of one of the cruciform control elements or rods 41 which is contained in a guide tube 44, also of cruciform cross section. Each control element guide tube 44 contains the coolant used in the reactor, say, water, and extends vertically as shown in FIG. 1 from the core support plate 22 downwardly to an upper respective flange 46 on the upper end of each cylinder 38. The control elements 41 are withdrawn downwardly from the reactor core 18 into the guide tubes 44. As shown best in FIGS. 4 and 5, the upper end of each piston 42 is connected by a respective coupling socket 48 to the lower end of a control rod body 50 which is cruciform in shape and bonded, say, by welding, to the lower end of a respective cruciform control rod. In effect, the control body is made up of four intersecting, mutually perpendicular blades 52 which are each a respective extension of the lower portion of each blade in the cruciform control rod. As shown best in FIGS. 4 and 5, each blade on the control rod body carries a plurality of vertically-spaced, elongated, rigid teeth or ridges 54 extending transversely to the direction of travel of the control rod body in the guide tube. Each ridge slopes downwardly and toward the nearest respective part of the guide tube wall to define a downwardly-opening cavity between adjacent ridges. As shown best in FIG. 4, the lower surface 56 of each ridge is concave downwardly, and the upper surface 58 of each ridge is convex upwardly. The ridges on opposite faces of each blade on the control rod body are staggered vertically so the crest 60 of each ridge on one side is located about the middle of a ridge on the opposite side. With this arrangement, the blade is not reduced at its thin portions below a thickness which would be unsafe.

The crests of the ridges are uniformly spaced from the interior of the guide tube to leave an annular gap 61 on opposite sides of the control rod body.

At the outer ends of the ridges, the convex surface is more nearly parallel to the direction of rod body travel than is the concave surface. Thus, the adjacent surfaces defining a cavity diverge from each other in a downward direction so the ridges tend to funnel water into the cavities when the water moves upwardly through the gap between the guide tube and control rod body.

A separate ball bearing 62 is mounted in a circular opening 63 through the lower edge of each rod body blade 52 on a radially-extending pin 64 journaled in the blade and extending through each ball. Each ball rolls on the interior adjacent surface of the guide tube and aids in keeping the control rod body aligned within the tube and the gap 61 substantially uniform.

When the piston is pressurized through the line 43 to move the control rod upwardly, water is displaced in the guide tube to flow downwardly through the gap 61 and toward the lower end of the control rod body. When the pressure in line 43 is reduced, the control rod and body move downwardly so that water is forced to flow upwardly through the gap 61. The shape of the ridges and teeth on the control rod body provides a high hydrodynamic resistance force to upward flow of liquid through the gap between the teeth and the guide tube and yet offers a much lower resistance to the flow of water in the opposite direction. This makes it possible to move the control rods into the nuclear reactor rapidly should an emergency arise requiring quick shutdown of the unit. Conversely, if some mechanical failure should cause loss of pressure in one of the supply lines or if there should be a mechanical failure or rupture of the coupling which would let the respective control rod be free to move downwardly, the hydrodynamic drag of the downwardly-facing teeth of the control rod body limits the rate at which the control rod can move down. Consequences of the resulting accidental control rod withdrawal are reduced.

In effect, the teeth on the control rod body cause the liquid in the guide tube to "see" a high resistance in the gap 61 when the control rod moves down and "see" a lower resistance when the control rod moves upwardly. This permits a large clearance and practical manufacturing tolerance between the guide tube and the control rods. Moreover, the shape of the teeth does not impede "scram" or rapid reactor shutdown.

FIG. 6 shows a schematic elevation of an alternate arrangement for obtaining the result just described with respect to FIGS. 4 and 5. In the embodiment shown in FIG. 6, a control rod 70 is mounted to move up and down in a guide tube 71 which has inwardly- and downwardly-facing teeth 72 formed on its interior surface on opposite sides of the guide tube. The teeth 72 are the same shape and arrangement as those described with respect to FIGS. 4 and 5. The control rod is spaced from the interior of the guide tube so that there is a gap 73 for the flow of fluid as the control rod is moved up and down. Downward movement of the control rod forces liquid to flow upwardly through the gap where it runs into high resistance because of the downwardly- and inwardly-extending teeth 72. Fluid flowing downwardly when the control rod 70 is moved upwardly experiences less turbulence and pressure drop because of the shape of the teeth. If desired, the teeth can be provided on both the guide tube and the control rod for additional turbulence.

FIG. 7 shows in schematic elevation the presently-preferred embodiment of the velocity limiter. A downwardly-opening, rigid cone 80 is disposed in a vertical cylindrical guide tube 82. A vertical hub 84 is screwed into a threaded fitting 86 in the central portion of the cone and extends downwardly to terminate in a male threaded connection 87. The upper end of a drive piston 88 is secured to the hub by a coupling socket 90 and extends downwardly into a cylinder 92 secured to the lower end of the guide tube. The piston is moved up and down as described previously with respect to FIGS. 1 through 5. An annular frustoconical, rigid skirt 94 is secured to and spaced below the cone by four (only one is shown in FIG. 7) vertical webs 96 spaced equally around the periphery of the cone. A separate wheel 97 is secured to the periphery of the skirt at the location of each web and is mounted to roll against the interior of the guide tube and keep the cone and skirt spaced from the guide tube to form a uniform annular flow gap 98 between the cone-skirt and the guide tube. The concave under-surface of the cone and the exterior of the hub diverge from each other in a downward direction. The upper surface of the skirt diverges from the lower surface of the cone in a upward direction to form an outwardly and downwardly converging annular slot of approximately constant flow area 99 which opens into gap 98. The outer peripheries of the cone and skirt are coterminus. The inner periphery of the skirt is spaced from the hub to leave an annular channel 100.

A control rod adapter 101 of cruciform cross section is formed integrally with the upper interior portion of the cone, leaving a convex periphery 102 of the cone projection outwardly of the adapter. The upper end of each blade 103 of the adapter is secured to the lower end of a respective blade 104 on a control rod 105. The control rod blades extend slightly outwardly of the adapter blades 103.

When the piston is actuated to move the cone and control rod 105 upwardly, liquid is forced downwardly past the convex portion 102 of the cone and through gap 98.

The shape of the upper periphery of the cone is such that the liquid sees a relatively low resistance in flowing through the gap, and, therefore, the control rod can be moved upwardly fairly fast. On the other hand, if, because of mechanical failure, the control rod starts to move downward rapidly, some liquid is forced upwardly around the hub through channel 100 and into the bottom of the cone. The liquid is then diverted downwardly and outwardly through the annular slot 99 formed between the skirt and the cone. The portion of the liquid forced outwardly through the annular slot is directed into the stream of the remainder of the liquid trying to flow upwardly through the gap 98. The two merging streams generate turbulence and increase the pressure drop through the gap for liquid trying to flow through it. The annular convex surface 102 at the periphery of the cone further increases flow loss as liquid moves upwardly. Thus, if there is a failure, the control rod cannot move downwardly rapidly because of the turbulence in the gap. However, the rod can be moved upwardly rapidly because of the streamline shape of the cone to fluid flow through the gap in a downward direction.

In the embodiment shown in FIG. 8, a truncated, downwardly- and inwardly-extending hollow cone 108 is secured at its upper or larger periphery 109 to the interior surface of a vertical cylindrical guide tube 110 so the cone and guide tube wall diverge from each other in one direction and toward a cylindrical control rod body 111 mounted in the guide tube to be movable up and down as described above with reference to FIGS. 1 through 4. An annular skirt or deflector 112 is secured by downwardly-extending legs 114 to the under-surface of the cone near the inner periphery of the cone. The cone and skirt diverge from each other toward the guide tube wall, and the inner peripheries of the cone and annular skirt are spaced the same distance from the control rod body 111. The diameter of the outer periphery of the skirt is less than the inside diameter of the guide tube to leave an annular space 116 between them.

The operation of the apparatus shown in FIG. 8 is similar in principle to that shown in FIG. 7. When the control rod body 111 moves upwardly, fluid in the space between the two bodies flows smoothly downwardly through the gap between the control rod body and the skirt and cone. When the control rod body moves downwardly, a portion of the water flowing upwardly through annular space 116 strikes the under-surface of the cone and is deflected inwardly through the slot between the cone and the skirt or deflector. This deflected stream of liquid flows into the gap between the control rod body and the peripheries of the cone and skirt so that turbulence is generated and the flowing liquid sees an increased resistance. Thus, the control rod body 111 can be moved up relatively fast with little fluid resistance and yet meets high resistance when it is moved fast in the opposite direction.

Although not entirely critical, the dimensions of the various components in the apparatus of this invention do affect the rate at which the control rod body can move up or down. For example, with the apparatus shown in FIG. 7, using water as the fluid in a typical nuclear reactor, good results are obtained when the gap 98 between the periphery of the skirt or cone and the cylindrical guide tube is between about .05 inch to about .75 inch. Of course, the velocity limiter will function even though the hollow guide tube or body is spaced much farther from the control body. In fact, all that is necessary is the presence of a hollow body to hold the fluid used. The turbulence surrounding the control body when it is moved in the direction to generate maximum turbulence effectively increases the control body during that direction of motion, thereby causing greater resistance than during motion in the opposite direction when there is less turbulence.

From the foregoing, it will be appreciated that the invention provides a simple, yet reliable device for letting a body move freely in one direction and yet limiting the velocity at which the body can move in the opposite direction. The velocity limiter of this invention provides for relatively large clearances and practical manufacturing tolerances in equipment such as nuclear reactors. This reduces the initial cost of the equipment, as well as maintenance and operation costs. Moreover, it increases the reliability of the equipment.

What is claimed is:

1. A nuclear reactor control mechanism comprising a hollow, cylindrical guide tube body adapted to be mounted in a nuclear reactor and hold a fluid, a control rod mounted in the guide tube, a generally conical-shaped body secured to the control rod in the guide tube and positioned with the periphery of the conical-shaped body substantially uniformly spaced from the guide tube to leave a gap between the conical-shaped body and the guide tube, means for reciprocating the control rod and the conical-shaped body in the guide tube and cause fluid to flow through the gap between the guide tube and the periphery of the conical-shaped body, and an annular skirt in the guide tube and spaced from the conical-shaped body in the direction in which the body diverges for generating more turbulence in the fluid flowing through the gap when the control rod is moved in one direction than in the other.

2. A nuclear reactor control mechanism comprising a hollow, cylindrical guide tube body adapted to be mounted in a nuclear reactor and hold a fluid, a control rod mounted in the guide tube, a generally conical-shaped body secured to the control rod in the guide tube and positioned with the periphery of the conical-shaped body substantially uniformly spaced from the guide tube to leave a gap between the conical-shaped body and the guide tube, means for reciprocating the control rod and the conical-shaped body in the guide tube and cause fluid to flow through the gap between the guide tube and the periphery of the conical-shaped body, and an annular skirt in the guide tube and spaced from the conical-shaped body in the direction in which the body diverges for generating more turbulence in the fluid flowing through the gap when the control rod is moved in one direction than in the other, the adjacent surfaces of the skirt and conical-shaped body extending in the same general direction.

3. A nuclear reactor control mechanism comprising a hollow, cylindrical guide tube body adapted to be mounted in a nuclear reactor and hold a fluid, a control rod mounted in the guide tube, a generally conical-shaped body secured to the control rod in the guide tube and positioned with the periphery of the conical-shaped body substantially uniformly spaced from the guide tube to leave a gap between the conical-shaped body and the guide tube, means for reciprocating the control rod and the conical-shaped body in the guide tube and cause fluid to flow through the gap between the guide tube and the periphery of the conical-shaped body, and an annular skirt in the guide tube and spaced from the conical-shaped body in the direction in which the body diverges for generating more turbulence in the fluid flowing through the gap when the control rod is moved in one direction than in the other, the skirt diverging from the conical body in a direction away from the gap.

4. A nuclear reactor control mechanism comprising a hollow, cylindrical guide tube body adapted to be mounted in a nuclear reactor and hold a fluid, a control rod mounted in the guide tube, a generally conical-shaped body secured to the control rod in the guide tube and positioned with the periphery of the conical-shaped body substantially uniformly spaced from the guide tube to leave a gap between the conical-shaped body and the guide tube, means for reciprocating the control rod and the conical-shaped body in the guide tube and cause fluid to flow through the gap between the guide tube and the periphery of the conical-shaped body, and an annular skirt in the guide tube and spaced from the conical-shaped body in the direction in which the body diverges for generating more turbulence in the fluid flowing through the gap when the control rod is moved in one direction than in the other, the outer periphery of the conical-shaped body being convex in the direction of convergence of the body.

5. A velocity control mechanism comprising a hollow guide body adapted to hold a fluid, a control body mounted in the hollow body and spaced from it to leave a gap between the two bodies, means for reciprocating the control body in the hollow body to drive fluid back and forth through the gap, means on at least one of the bodies defining a cavity having opposed surfaces diverging from each other in one of the directions in which the control body is movable, and a deflector spaced from the surfaces in the general direction in which they diverge for generating more turbulence in the fluid flowing through the gap when the control body is moved in one direction than in the other.

6. A velocity control mechanism comprising a hollow guide body adapted to hold a fluid, a control body mounted in the hollow body and spaced from it to leave a gap between the two bodies, means for reciprocating the control body in the hollow body to drive fluid back and forth through the gap, means on at least one of the bodies defining a cavity having opposed surfaces diverging from each other in one of the directions in which the control body is movable, the cavity opening toward the gap, and a deflector spaced from the surfaces in the general direction in which they diverge for generating more turbulence in the fluid flowing through the gap when the control body is moved in one direction than in the other.

7. A velocity control mechanism comprising a hollow guide body adapted to hold a fluid, a control body mounted in the hollow body and spaced from it to leave a gap between the two bodies, means for reciprocating the control body in the hollow body to drive fluid back and forth through the gap, means on at least one of the bodies defining a cavity having opposed surfaces diverging from each other in one of the directions in which the control body is movable, the cavity opening toward the gap, and a deflector spaced from the surfaces in the general direction in which they diverge for generating more turbulence in the fluid flowing through the gap when the control body is moved in one direction than in the other, the surface of the deflector and cavity surface nearer the gap converging in a direction toward the gap.

References Cited

UNITED STATES PATENTS

| | | | |
|---|---|---|---|
| 654,341 | 7/1900 | Bristol | 188—96 |
| 2,168,679 | 8/1939 | Myers | 188—88 |
| 2,595,239 | 5/1952 | Gay | 188—88 X |
| 2,752,149 | 6/1956 | Forcellini | 188—88 X |

FOREIGN PATENTS

| | | |
|---|---|---|
| 114,161 | 9/1929 | Austria. |
| 616,013 | 10/1926 | France. |

MILTON BUCHLER, *Primary Examiner.*

G. E. HALVOSA, *Assistant Examiner.*